(No Model.) 9 Sheets—Sheet 1.

G. A. FAIRFIELD & G. E. WITHERELL.
METAL SCREW MACHINE.

No. 409,674. Patented Aug. 27, 1889.

Witnesses.
John Edwards Jr.
W. H. Whiting.

Inventors.
George A. Fairfield.
George E. Witherell.
By James Shepard
Atty.

(No Model.) 9 Sheets—Sheet 2.

G. A. FAIRFIELD & G. E. WITHERELL.
METAL SCREW MACHINE.

No. 409,674. Patented Aug. 27, 1889.

Fig. 2.

Witnesses.
John Edwards Jr.
W. H. Whiting.

Inventors.
George A Fairfield and George E. Witherell.
By James Shepard Atty.

(No Model.) 9 Sheets—Sheet 3.

G. A. FAIRFIELD & G. E. WITHERELL.
METAL SCREW MACHINE.

No. 409,674. Patented Aug. 27, 1889.

Witnesses.
John Edwards Jr.
W. H. Whiting.

Inventors.
George A. Fairfield.
George E. Witherell.
By James Shepard.
Atty.

(No Model.) 9 Sheets—Sheet 6.

G. A. FAIRFIELD & G. E. WITHERELL.
METAL SCREW MACHINE.

No. 409,674. Patented Aug. 27, 1889.

Witnesses.
John Edwards Jr.
W. H. Whiting.

Inventors,
George A. Fairfield,
George E. Witherell.
By James Shepard Atty.

(No Model.) 9 Sheets—Sheet 7.

G. A. FAIRFIELD & G. E. WITHERELL.
METAL SCREW MACHINE.

No. 409,674. Patented Aug. 27, 1889.

Witnesses.
John Edwards Jr.
W. H. Whiting

Inventors.
George A. Fairfield.
George E. Witherell.
By James Shepard.
Atty.

UNITED STATES PATENT OFFICE.

GEORGE A. FAIRFIELD AND GEORGE E. WITHERELL, OF HARTFORD, CONNECTICUT, ASSIGNORS TO THE HARTFORD MACHINE SCREW COMPANY, OF SAME PLACE.

METAL-SCREW MACHINE.

SPECIFICATION forming part of Letters Patent No. 409,674, dated August 27, 1889.

Application filed May 1, 1889. Serial No. 309,168. (No model.)

*To all whom it may concern:*

Be it known that we, GEORGE A. FAIRFIELD and GEORGE E. WITHERELL, both citizens of the United States, residing at Hartford, in the county of Hartford and State of Connecticut, have invented certain new and useful Improvements in Machines for Making Screws, of which the following is a specification.

Our invention relates to improvements in machines for making screws; and the objects of our improvement are to render the machine automatic in its action, and in general to improve the efficiency, especially with reference to its reliable action.

In the accompanying drawings.

A designates the main portion of the bed or frame of the machine; B B, main uprights of the head-block, and C the tail-block. The main shaft D extends substantially from end to end of the machine and takes its bearings in the tail-block and uprights B B. Within the cap or case E is a revolving head F, carrying four spindles 18, one end of said head taking its bearings upon the shaft D, while the other end has a bearing in one of the uprights B, through which the shaft passes, so that said upright, directly and indirectly, furnishes a bearing for both that end of the head and a portion of the shaft D. The shaft D is provided with a geared wheel 19, which meshes into a driving-pinion 20, (see Fig. 1,) which pinion is or may be driven by a special speeding device 21, of a well-known construction, and which forms no part of our invention. We therefore consider it unnecessary to specifically describe said speeding mechanism, which may be omitted, if desired, and the machine driven by direct application of power in the ordinary manner; or any other speeding mechanism may be substituted for that shown.

G designates a cam-pulley, rigidly mounted on the shaft D, so as to revolve with it, and having upon its periphery the series of cams 22 and 23, and at one side the series of cams 24 and 25.

Figure 6:
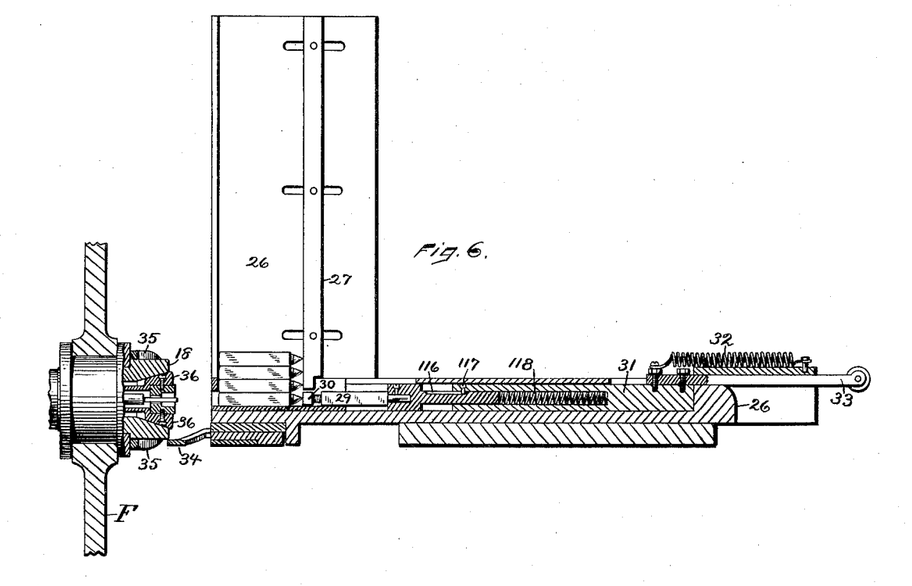
Fig. 6 is a longitudinal section of detached parts on the line $z$ of Fig. 1, some of the parts being shown in elevation and on a larger scale than the preceding figures.

Upon the front side of the machine there is a sliding hopper 26, having an adjustable side 27, (see Fig. 6,) to adjust it for blanks of different lengths. This hopper is arranged to slide longitudinally in suitable ways, and carries a stud or friction-roller 28, (see Figs. 1 and 2,) which roller is acted upon by the peripheral cams 22 and 23 of the cam-pulley G to reciprocate said hopper at the proper times. The base of the hopper 26 is also provided with a sliding plunger 29, (see Fig. 6,) the front end of which is provided with a screw-adjustable head 30, the effect of which is to vary the length of the plunger 29. This plunger 29 is mounted within the hollow slide 31 and held forward by the spring 118, which presses against the end of the plunger-shank. This plunger-shank is provided with a slot 116, into which a stop-pin 117 enters, (see Fig. 6,) to limit the forward motion of said plunger under the action of said spring and to make the plunger draw back with the withdrawal of the hollow slide 31. The spring 118 is intended to be strong enough to push the bottom blank into the holding-jaws of the chuck without yielding, provided there is no unusual obstruction. A spring 32, having one end secured to the base of the hopper 26 and its other end to the hollow slide 31, has a tendency to draw said plunger in one direction, and it is moved in the opposite direction by means of the inner series of side acting cams 24 of the cam-pulley G, said cams acting upon the extension 33 of said hollow slide. This hopper is so set that the bottom blank within said hopper will be in substantial alignment with the front one of the spindles 18 of the revolving head during their period of rest.

Figure 1:
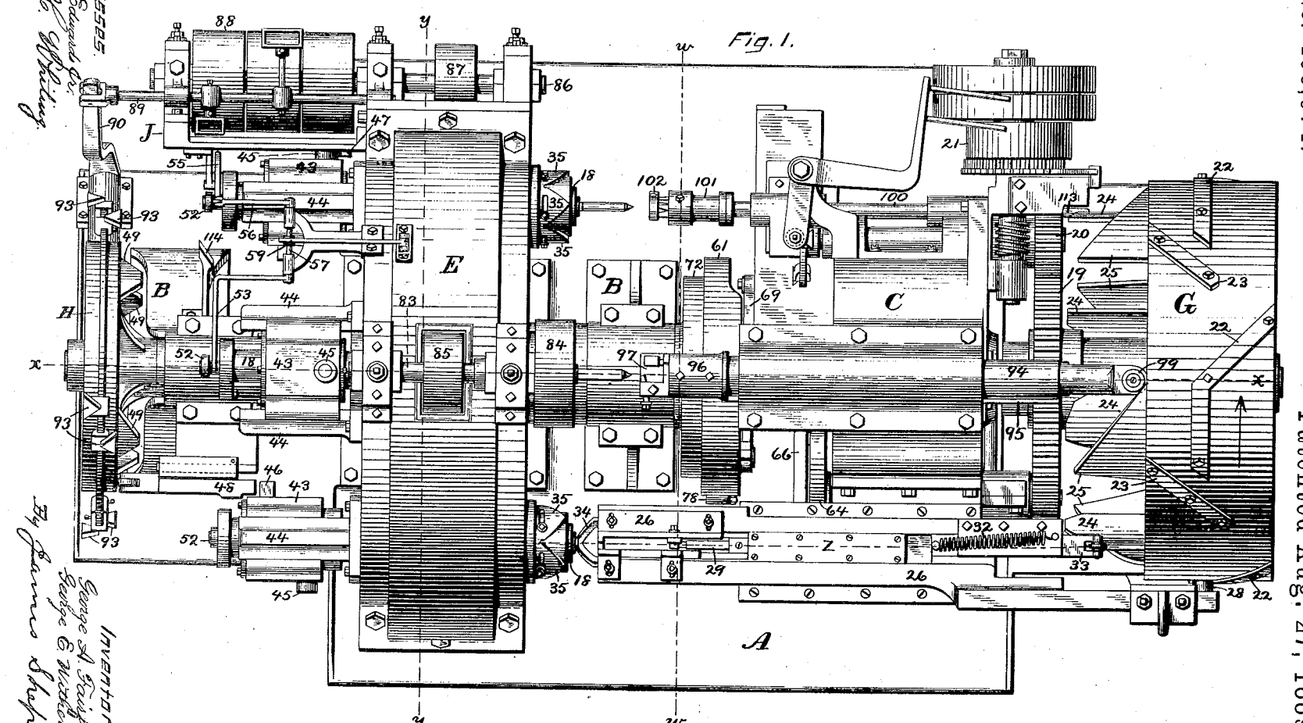
Figure 1 is a plan view of our machine.
Figure 2:
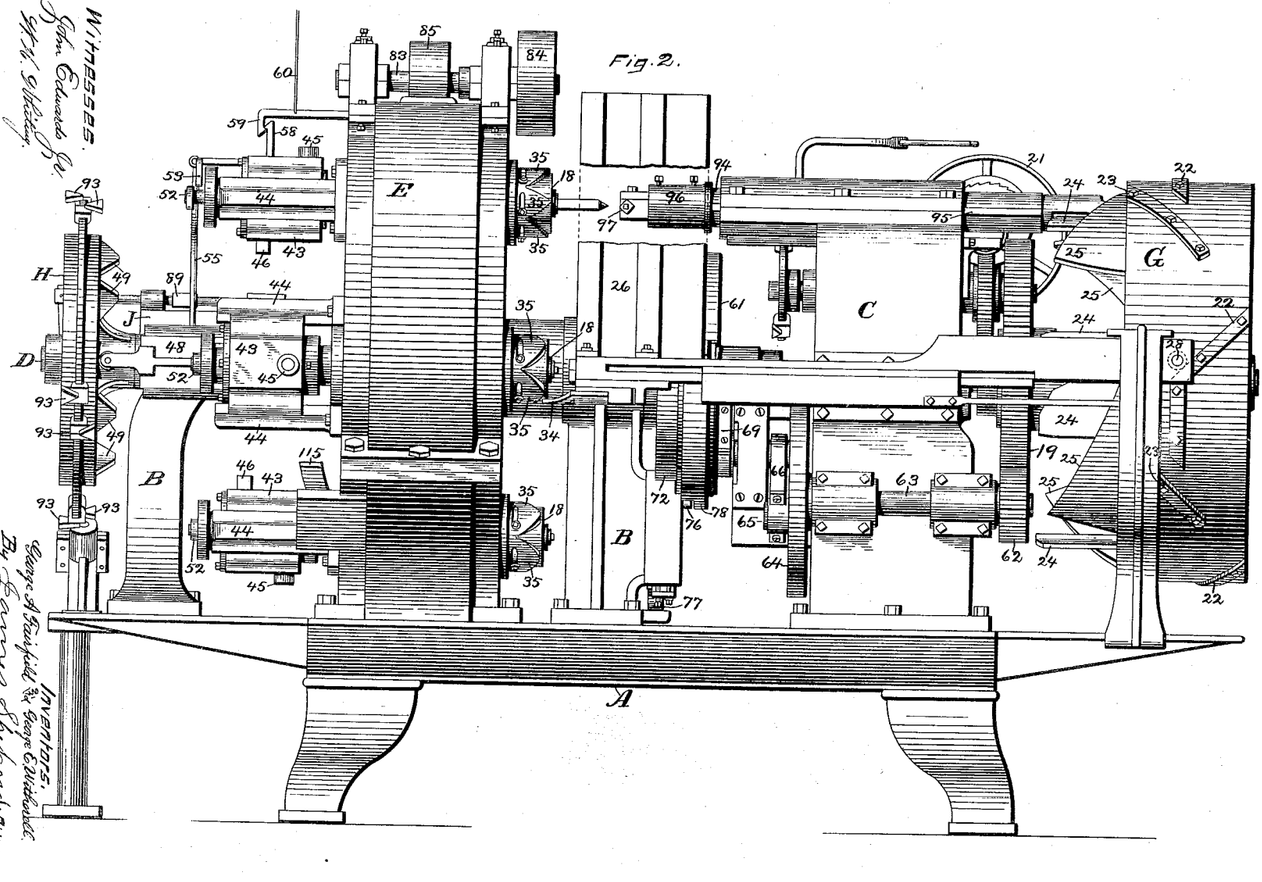
Fig. 2 is a front elevation thereof.
Figure 4:
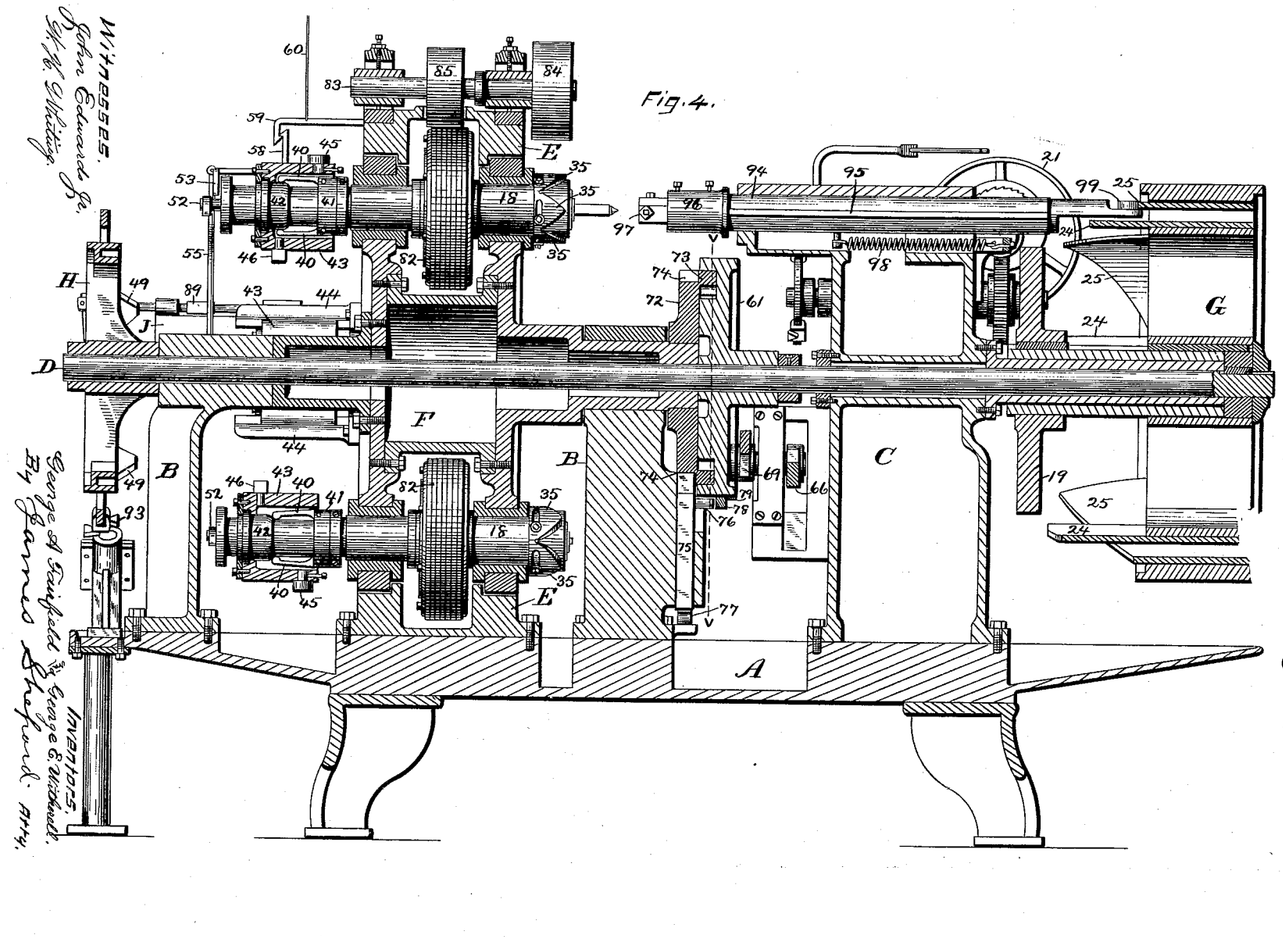
Fig. 4 is a central longitudinal section, partly in elevation, on line $xx$ of Fig. 1.
Figure 5:
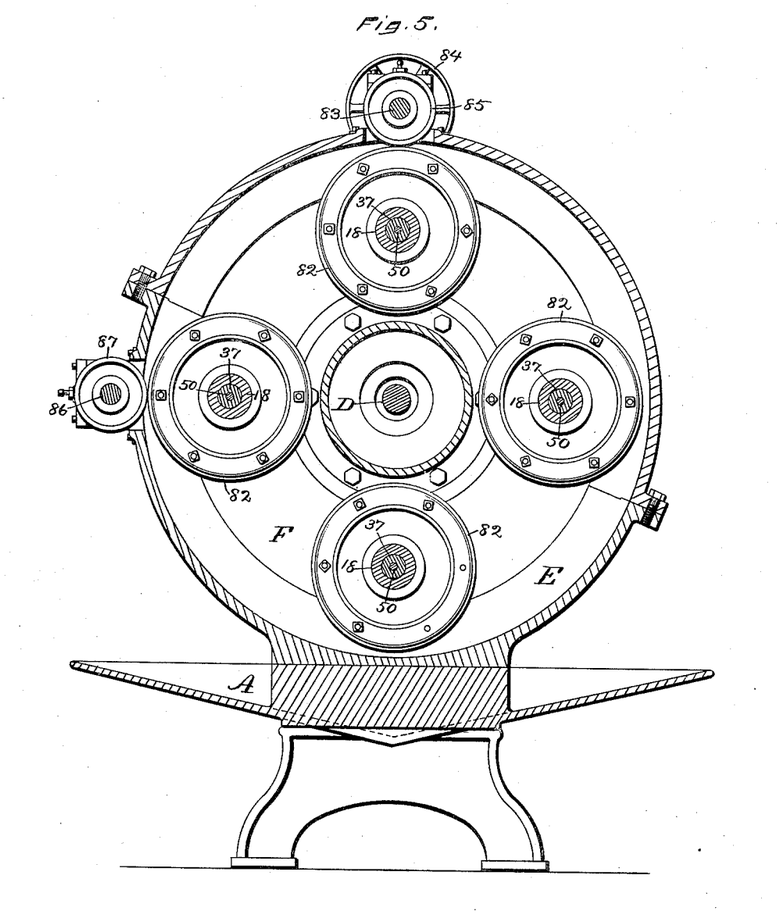
Fig. 5 is a transverse section on the line $yy$ of Fig. 1.

The front end of the hopper is provided with a pointed cam 34, which acts, in connection with the confronting edges of correspondingly-shaped cams 35, on the several spindles 18. For convenience of construction, the cams 35 are formed on a ring and are secured to the spindles by a slot-and-screw connection, as shown in Figs. 1, 2, and 4, whereby they may be adjusted relatively to the square of the holding-chuck. Each spindle is hollow and provided with a holding-chuck consisting of spring-jaws 36, having wedge or cam shaped sides that fit the flaring mouth of the hollow spindle, as in ordinary spring-jaws. These jaws are secured within the sliding sleeve 37, Fig. 14, the rear end of which is provided with lugs 38, that rest in longitudinal slots 39 at the rear end of said spindles, whereby the jaws are prevented from turning within the spindles and whereby shoulders are formed for the engagement of the angle-levers 40. These angle-levers 40 are pivoted within a sleeve 41, that is rigidly secured to the spindles.

Figures 15, 16, 17:
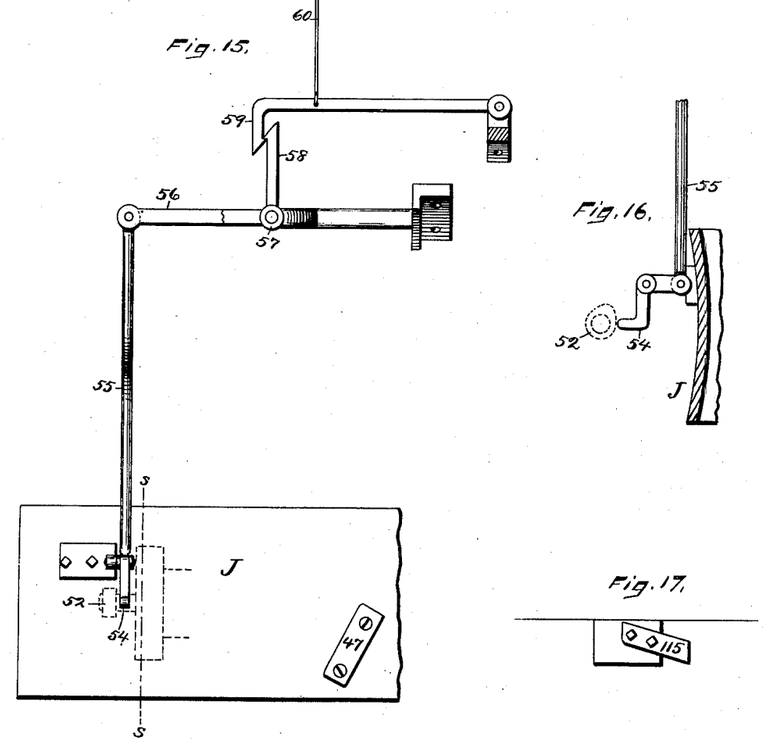
Fig. 15 is a front elevation of detached parts, showing the stop-mechanism and also the stationary cam for opening the chuck.
Fig. 16 is a side elevation of a portion of said stop mechanism, looking toward the left, the framing to which said lever is attached being shown in section on the line $ss$ of Fig. 15.
Fig. 17 is a detached view of one of the stationary cams, showing that side which faces the axis of the revolving head, said figure being on the same scale as Fig. 1.

Surrounding the slotted part of the spindle 18 there is a sliding cone 42 for engagement with the longest member of said angle-lever. This cone is secured to a sliding carriage 43, that slides in ways formed upon lugs 44, attached to the revolving head F, said carriage being provided with a roller 45 and stud 46 for being acted upon by the stationary cam 47, Figs. 1, 3, and 15, and the slide 48, which slide is pushed toward the head by means of the series of cams 49 upon the side of the cam-wheel H at one end of the shaft D and returned by a spring. (Not shown.)

Figure 14:
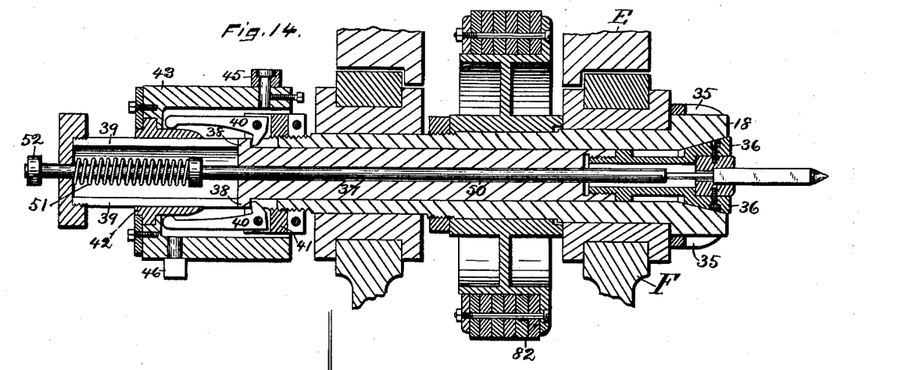
Fig. 14 is a central longitudinal section of one of the spindles and holding-chuck, some of the parts being shown in elevation.

Within the sleeve 37 in the axis of each spindle is a sliding knockout-rod 50, which is continually pressed upon in an outward direction by means of the spring 51, Fig. 14. This knockout-rod should be provided with a spline or other suitable device to make it revolve with the spindle, and is provided at its rear end with a cam 52 for engagement at times with either of the stop-levers 53 or 54. The stop-lever 54 is mounted upon a stationary pivot on the shaft-frame J, which forms an extension of the cap or case E. One end of said lever is connected by means of a pitman 55 with the rocking arm 56 of the rock-shaft 57, the stop-lever 53 being rigidly connected to the other end of said rock-shaft 57. The rock-shaft 57 is also provided with a rocking arm 58, having a shoulder at its outer end that engages the latch-lever 59, said latch-lever and bearings of the rock-shaft being mounted upon suitable lugs that are rigidly secured to the cap or case E.

The pivoted latch-lever 59 is provided with a cord or wire 60 for connection with any spring or weight actuated shipper for stopping the machine.

The revolving head F is given an intermittent rotary motion by means of the head-operating disk 61 and its connections.

Figure 7:
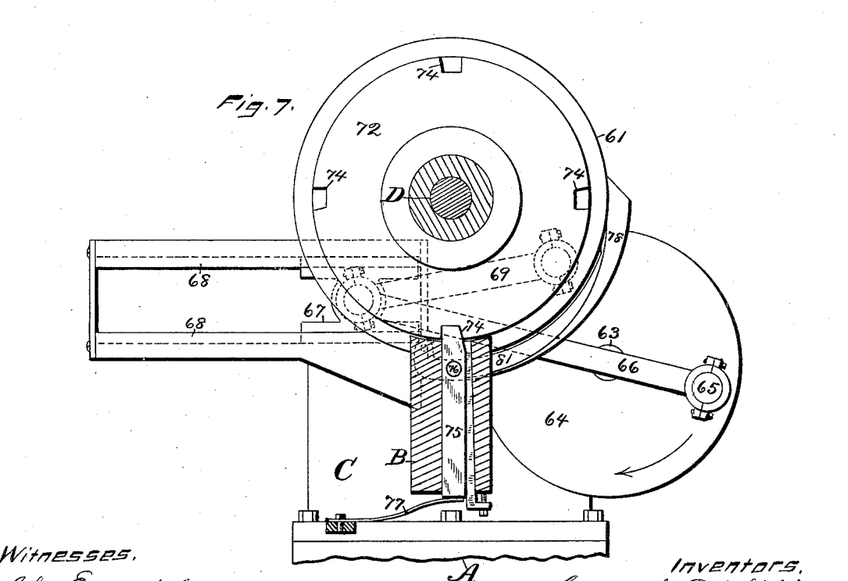
Fig. 7 is a transverse section of detached parts on the line $ww$ of Fig. 1, looking toward the right.
Figure 8:
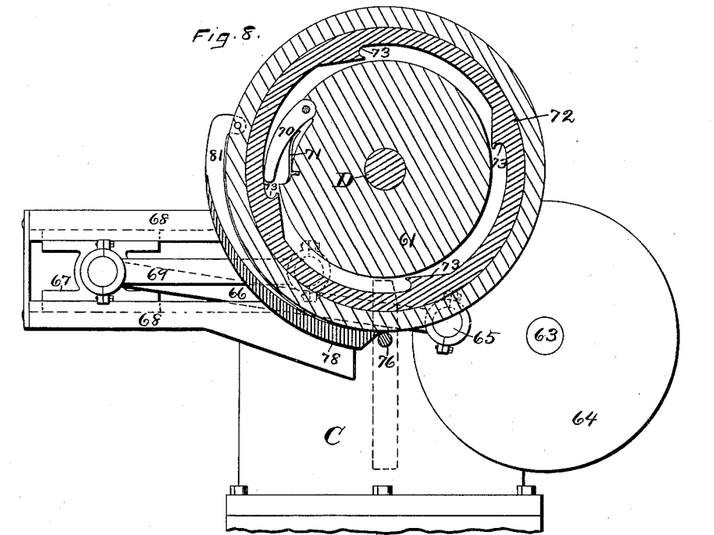
Fig. 8 is a transverse section of nearly all of the same parts, but in a different position, the plane of section being indicated by the line $vv$, Fig. 4.

The gear-wheel 19 meshes into a pinion 62 on the shaft 63, to one end of which shaft is the crank-pin disk 64, carrying the crank-pin 65, to which one end of the pitman 66 is connected, the other end being connected with the cross-head 67, that slides backward and forward on the ways 68, Figs. 7 and 8. Another pitman 69 connects this cross-head with the head-operating disk 61, whereby said disk is reciprocated to the extent of one-quarter of a revolution for each revolution of the crank-pin disk 64.

One side of the head-operating disk 61 has an annular groove formed in it, and the part on the inside of said groove is provided with a pawl 70, which is thrown outwardly by a spring 71. (See Fig. 8.) This head-operating disk is held against longitudinal movement upon the shaft D, and is free to oscillate independently of the shaft. By the side of said head-operating disk is the locking-disk 72, which is rigidly secured to the hub of the revolving head F, so as to rotate therewith. That side of this disk which faces the head-operating disk 61 is provided with an internal ratchet 73, having four teeth at equal distances apart. This ratchet sets into the annular groove in said head-operating disk, so as to be engaged by the pawl 70. The locking-disk 72 is also provided with four peripheral notches 74, which are engaged by the locking-bolt 75. This locking-bolt is pressed upwardly into the notches 74 by means of the spring 77, Fig. 7. It is also provided with a laterally-projecting pin 76.

Figure 9:
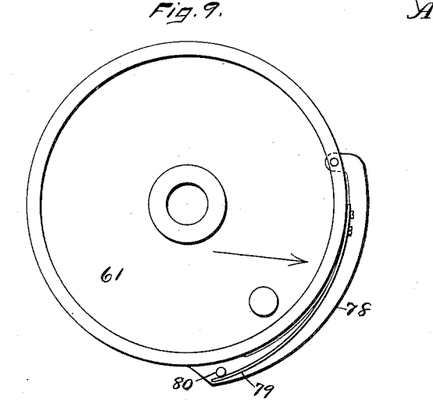
Fig. 9 is a side elevation of the head-operating disk, showing the opposite side from that represented in Figs. 7 and 8.
Figure 10:
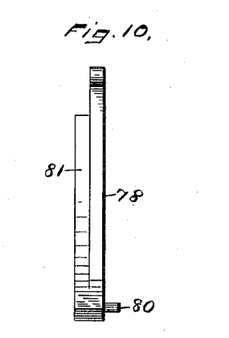
Fig. 10 shows the inside edge of the cam belonging to the disk, Fig. 9.

Pivoted to the edge of the head-operating disk 61, and in its normal position lying upon the periphery of said disk, is the cam 78. This cam is held against the periphery of the disk 61 by means of a spring 79, (shown most clearly in Fig. 9,) one end of which is secured to the periphery of the disk 61 and the other end of which bears upon the laterally-projecting pin 80 at the outer end of said cam. This cam is rabbeted upon one side, as shown at 81 in Figs. 7, 8, and 10, the rabbet vanishing or running out before it reaches the pivoted end of said cam, whereby said end is the thinnest. The forward or outer end of the cam is beveled, as shown, which beveled end and the projecting portion of the rabbet form the operative parts of the cam, and act in connection with the pin 76 of the locking-bolt 75, the beveled end of the cam withdrawing the bolt from the notched disk, while the rabbet permits the cam to draw back of said pin into position for again withdrawing the locking-bolt.

Each of the respective spindles is provided with a friction driving-wheel 82, preferably having a leather face.

Mounted upon the top of the case or cap E is a shaft 83, bearing a driving-pulley 84, for receiving power from a suitable belt, and a friction driving-pulley 85, for acting upon the respective friction-wheels 82 as they are intermittently brought underneath said pulley, where they remain while the head is at rest, so that a revolving motion is imparted to the respective spindles at that time. In like manner motion is communicated to the spindles as they stop at the rear of the machine by means of the shaft 86 and its friction driving-pulley 87. This shaft is driven by means of belts passing over the set of pulleys 88, the middle one of which is fast to the shaft 86 and the other two are loose. One of the belts running upon said pulleys is a cross-belt and the other is straight. These belts (not shown) will be run through guides in the shipper 89, one end of which shipper is connected with the rocking arm 90. This rocking arm is rigidly connected with a rock-shaft 91, Fig. 3, to the opposite end of which is another rocking arm 92, whose end engages the cams 93 on the cam-wheel II, whereby the shipper is reciprocated to throw its respective belts from one of the loose pulleys to the fast pulley for changing the direction of the revolution of the shaft 86, in the well-known manner of shipping such belts for reversing motion in other machines.

At the top of the tail-block C there is a slide 94, fitted by means of a spline 95 or equivalent device to prevent it from rotating, and provided at its front end with a chuck 96 for holding any desired tool—as, for instance, the roughing-box or turning-tool 97. This slide is pulled in one direction by means of the spring 98, Fig. 4, to withdraw it from its work, and is forced in the opposite direction up to its work by means of the series of cams 25 on the cam-pulley G, said cams preferably acting upon a friction-roller 99 on the end of said slide.

Figures 11, 12, 13:
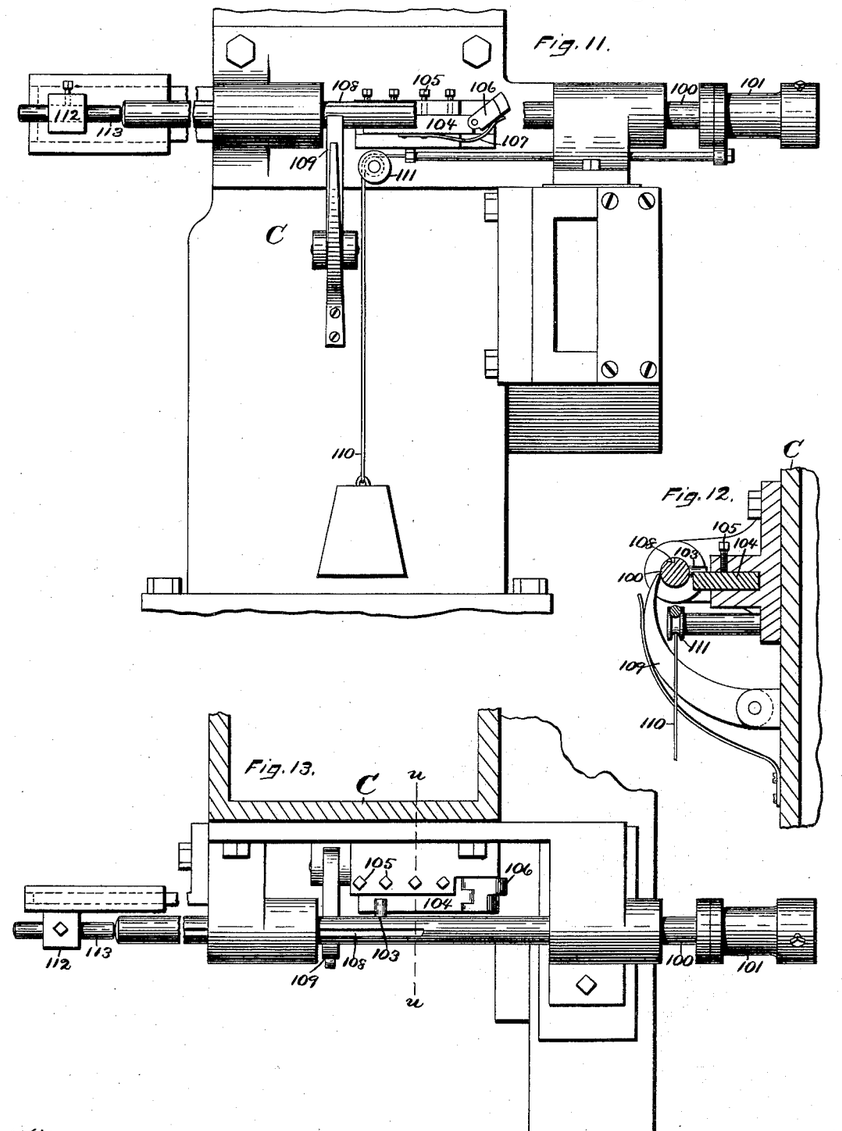
Fig. 11 is a rear elevation of detached parts, illustrating the threading-die slide and connected parts, the same being on a still larger scale than Figs. 6, 7, 8, 9, and 10.
Fig. 12 is a detached transverse section of the parts shown in Fig. 11, on line $uu$ of Fig. 13.
Fig. 13 is a plan view of the same parts, a portion of the frame being shown in horizontal section.

At the rear side of the tail-block C is the threading-die slide 100, bearing at its front end a chuck 101, for holding the threading-die 102. This slide is prevented from rotation when cutting a thread by means of the laterally-projecting pin 103, Figs. 12 and 13, which bears upon an adjustable ledge 104, that is stationarily fastened by set-screws 105 at the rear of the tail-block, and by means of which screws said ledge may be adjusted longitudinally. The end of this ledge is provided with a hinged piece 106, that is pivoted thereto by means of a stop-joint, (see Fig. 11,) so that it may swing downwardly with its upper surface into alignment with that of the rest of the ledge, but no farther, while it is free to swing upwardly under the influence of the spring 107. The slide is prevented from rotation in the opposite direction by means of the longitudinal shoulder 108 on said slide and the spring-pressed pawl 109. It is pulled back away from its work by means of a weighted cord 110, which extends over a pulley 111, mounted upon a fixed stud. At the opposite end of said slide 100 there is a sliding socket 112, that slides in suitable ways on an extension of the tail-block, and within which an attachable and detachable follower 113, of any desired length, may be placed in alignment with the slide 100. This follower is fully shown in Figs. 11 and 13, and partially shown in Fig. 1. The series of cams 24 on the cam-pulley G act upon this follower to force the slide 100 up to its work.

Figure 3:
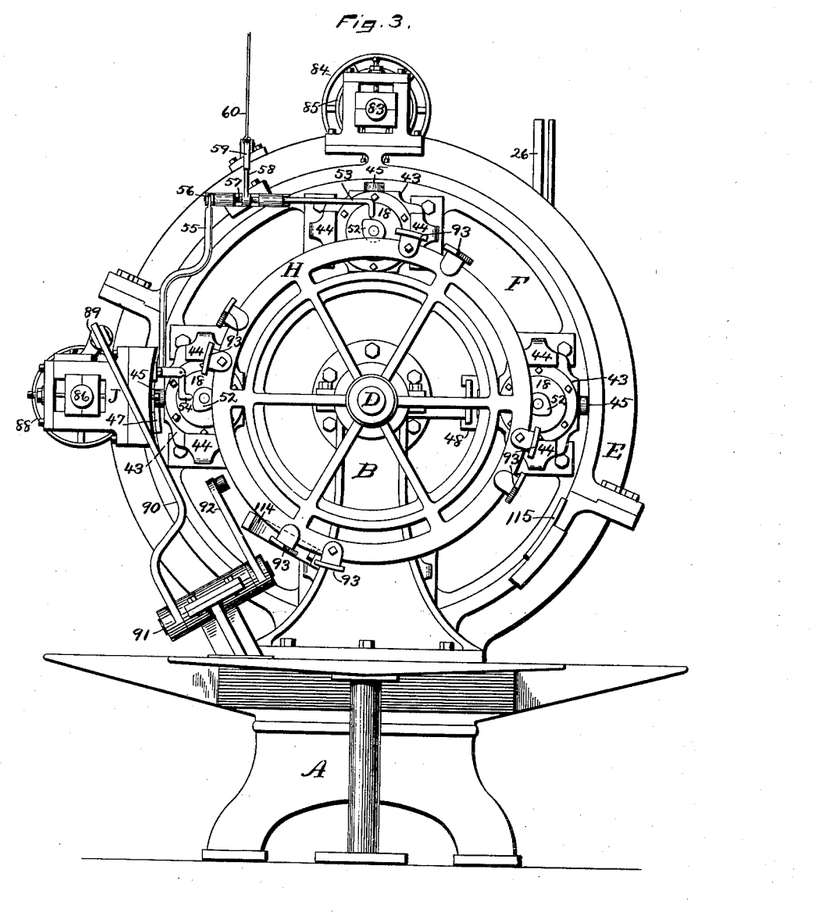
Fig. 3 is a side elevation, showing the left-hand end of the machine.

The spring 51 is intended to operate the knockout to discharge the work from the jaws as soon as the jaws are opened; but if for any reason the spring fails to work we provide the stationary cam 114, Figs. 1 and 3, on one of the uprights B, which will be engaged by the end of the knockout-rod and positively move the rod longitudinally in a direction to knock out the work. In like manner, if for any reason the sliding carriage that opens and closes the jaws shall not be in a position to fully open said jaws when it arrives at the front side of the machine, we provide the stationary cam 115, fixed to the cam or case E in the path of the friction-roller 45, which engaging said cam will fully open the jaws preparatory to receiving the work.

The series of spindles are concentrically mounted within the head at equal distances from each other, and the hopper and slides 94 and 100 are arranged at like distances apart and respectively in alignment with the three upper spindles during each period of rest between the intermittent movements of the revolving head.

As illustrated, the machine is specially adapted for milling or roughing and threading bolt-blanks which are square in cross-section and whose ends have previously been dressed to the proper form. Four of these blanks are illustrated within the hopper in Fig. 6, and another blank is illustrated in the chuck-jaws in Fig. 14. The blanks are placed in the hopper with that portion of the square which is to form the bolt-head toward the revolving head, and the chuck-jaws are provided with faces adapted to grasp that end of said square blanks. The length of the blanks will of course vary with the variation in the bolts that may be desired. The spindle in the intermittently-rotating head immediately in front of the hopper has its jaws opened ready to receive a blank, the movement of the head being so timed with reference to the hopper mechanism that when the head is at rest and the shaft D is revolving the peripheral cams 22 of the cam-pulley G on shaft D (which is continually rotating) force the hopper toward the head. The cam 34 at the front end of the hopper, entering between the confronting edges of the cams 35 on the spindles, will bring said spindles into a position to have the square of the chuck-jaws coincide with the square of the blanks within the hopper. The cam is so shaped as to let the hopper remain at rest for a while in this position, during which period of rest one of the cams 24 on the cam-wheel G acts upon the extension 33 of the plunger 29 to force the bottom blank within the hopper forward with its head end within the chuck-jaws, the end of said blank striking the end of the knockout-rod and forcing it backwardly against its spring. The cams 49 on the cam-wheel H then force the slide 48 against the stud 46 to move the carriage 43, thereby forcing the cone 42 between the long ends of the angle-levers 40, which levers draw the sleeve 37 and jaws 36 into the spindle to firmly force the jaws upon said blank, as illustrated in Fig. 14. If the blank meets with any obstruction while forcing it from the hopper, the spring 118 permits the plunger to yield and prevents a breakage of the machine. The spring 32 returns the plunger 29 to its normal position and the peripheral cams 23 on the cam-pulley G withdraw the hopper from the blank. After the hopper and blank within the jaws are disengaged the head-operating disk 61 will be carried by the crank-pin disk 64 and connected parts into the position illustrated in Fig. 8, with the beveled end of the cam to one side of the pin 76 of the locking-bolt 75. The head-operating disk 61 then reverses its movement, and forcing its beveled end under said pin withdraws the locking-bolt 75 from the notches 74 of the locking-disk 73. The pawl 70 then engages one of the teeth of the ratchet 73 and revolves the locking-disk and the rotating head one-quarter of a revolution, bringing the spindle which last received a blank to the top of the machine and another empty spindle to its position in front of the hopper, ready to receive another blank, in the manner before described. As the head-operating disk 61 carries its cam under the pin 76, said pin rides over the outer edge of said cam until it runs off the end of the rabbeted portion 81, when it and the locking-bolt 75 are free to be forced into the next notch 74 of the locking-disk under the influence of the spring 77. When the head-operating disk 61 makes its return motion, the pin 76 remains in its normal position and passes through or under the rabbeted portion 81, the cam swinging outwardly on its pivot until its end passes the pin 76, after which the spring 79 will bring the cam 78 against the periphery of the disk, ready to have its beveled end again withdraw the locking-bolt, in the manner before described. During the period of rest one of the side cams 25 on the cam-wheel G acts upon the slide 94 to press it forward, when the milling-tool or roughing-box turns down or mills the body of the blank into its round form for any desired length. The spindle in alignment with said slide is at this time being driven by having its friction-wheel 82 in contact with the friction-pulley 85 at the top of the case E. The spring 98 withdraws the slide 95 after it has done its work, and the revolving head makes another quarter-revolution, in the manner before described, bringing the rounded bolt-blank into alignment with the threading-die slide 100. One of the cams 24, acting upon the follower 113, presses the slide 100 forward against the bolt in said spindle. The shipping mechanism of the shaft 86 has been acted upon by the cams 93 of the cam-wheel H to carry the driving-belts on the pulleys 88 into the position for driving the spindle in a proper direction to cut the thread. For longer or shorter bolts followers of different lengths may be substituted for the follower 113. After the threading-die has been started upon the blank it will draw the spindle along, while the pin 103, resting upon the adjustable ledge 104, holds the die and slide from revolving. When the pin strikes the jointed portion, said portion turns down to a horizontal position and is stopped by its stop joint or hinge, and the pin travels over it the same as if it were all in one piece until the pin slips off the end of the ledge, leaving the slide 100 free to revolve with the spindle until the shipping mechanism reverses its motion. When the pin slips off the ledge, the spring 107 throws the hinged piece 106 up out of the way, so that the pin does not come in contact with it. By adjusting the ledge 104 longitudinally with reference to the slide 100, so that the pin will slip off at a particular point, the threading-dies may be made to travel on the body of the bolt for threading it up to a given distance from its head. The cams 93 on the cam-pulley H operate the shipper to reverse the motion of the spindle and unscrew the threading-die from the bolt, the slide 100 then being prevented from rotating by means of the spring-pressed pawl 109 engaging the slot or shoulder 108. As soon as the threading-die is unscrewed from the bolt, the weighted cord 110 returns the slide 100 and follower 113 to their normal position, ready for threading another bolt. At the next intermittent movement of the revolving head the roller 45 on the carriage 43 engages the stationary cam 47 and moves said carriage in a direction to withdraw the cone 42 from between the angle-levers 40, thereby releasing the sleeve 37 and permitting the spring-jaws to open, so that the spring 52 will move the knockout in a direction to force the bolt from the jaws. If, however, for any reason the jaws are not freed from the bolt, the end of the knockout will engage the stationary cam 114 and force the knockout in a direction to free the jaws. When the respective spindles are stopped during their intermittent motion at the lower part of the machine, they remain idle. We have followed one spindle around with the head; but it will of course be understood that the several spindles are operating at the same time—that is to say, during each period of rest one spindle is supplied with the blanks from the hopper, another spindle and connected parts are turning or roughing the body of the blank, and the body of the blank in the other spindle is being threaded. If for any reason the blank is not properly seated in the jaws when they stop in front of the hopper, and the plunger-rod is not pushed outwardly by the blank, then the cam 52 on the end of said rod will be coincident with the position of the stop-lever 53, so that as soon as the spindle arrives at the top of the machine and begins to revolve said cam will hit the stop-lever 53 and move the rocking shaft 57 and rocking arm 58, thereby releasing the latch-lever 59, so that it is free to rise up and release the shipping-cord 60. This cord is intended to run to any convenient point where there is a shipper or a clutch mechanism for stopping or releasing the shaft that drives the machine, which shipper or clutch mechanism may be actuated by a weight, a cam, or spring to throw the parts into position to stop the driving-shaft, while the cord 60 and latch 59 are designed to hold said shipping or clutch mechanism in position to drive the machine. In like manner the stop-lever 54 will be acted upon through the pitman 55 to release the same latch-lever and cord 59 and 60, if for any reason the knockout-rod is not in its proper position when the spindle arrives at the rear side of the machine. When a bolt or blank is properly seated within the jaws, the cam 52 is pushed out far enough to pass by the stop-levers without coming in contact therewith.

We claim as our invention—

1. The combination of an intermittently-revolving head, a series of spindles mounted therein and provided with holding-jaws and series of cams 35, the hopper 26, and the sliding cam 34, acting upon confronting edges of the cams 35, substantially as described, and for the purpose specified.

2. The combination of an intermittently-revolving head, a series of spindles mounted therein and provided with holding-jaws, the hopper 26, sliding cam 34, and the cams 35, in the form of a ring, circumferentially adjustable on the spindles, substantially as described, and for the purpose specified.

3. The combination of the intermittently-revolving head, a series of spindles mounted therein, the hopper 26, its plunger 29, the hollow slide 31, for receiving the shank of the plunger, the spring 118, and mechanism for reciprocating said hollow slide and plunger, substantially as described, and for the purpose specified.

4. The combination of the hopper 26, the plunger 29, the screw-adjustable head 30 at the end of said plunger, and mechanism for reciprocating said plunger and head, substantially as described, and for the purpose specified.

5. The combination of a revolving head, the head-operating disk 61, mechanism for oscillating said disk a given fractional part of a revolution, the pawl 70, mounted on said disk, the locking-disk 72, provided with a ratchet for engagement with said pawl and locking-recesses 74, a locking-bolt 75, provided with pin 76, and the hinged cam 78, hinged to said head-operating disk and acting to withdraw said locking-bolt, substantially as described, and for the purpose specified.

6. The combination of an intermittently-rotating head, a series of spindles mounted therein, the crank-pin disk 64, cross-head 67, pitmen 66 and 69, head-operating disk 61, pawl 70, mounted thereon, the hinged cam 78, also mounted on said disk, the locking-bolt 75, and the locking-disk 72, provided with the ratchet and locking recesses, substantially as described, and for the purpose specified.

7. The combination of the spring-pressed locking-bolt 75, its pin or projection 76, the locking-disk 72, provided with notches or recesses and a ratchet, the head-operating disk 61, the pawl 70, mounted thereon, the cam 78, provided with a rabbet 81, the spring 79, for pressing said cam against the disk 61, and mechanism for oscillating said disk, substantially as described, and for the purpose specified.

8. In a machine for threading screws, the combination of the threading-slide 100, mechanism for forcing said slide to its work, the laterally-projecting pin 103, and the adjustable ledge 104, for being engaged by said pin, substantially as described, and for the purpose specified.

9. In a machine for threading screws, the combination of the threading-slide 100, mechanism for forcing said slide to its work, the laterally-projecting pin 103, the adjustable ledge 104, for being engaged by said pin, the pivoted piece 106, provided with a stop-joint at the end of said ledge, and the spring 107, substantially as described, and for the purpose specified.

10. In a machine for threading screws, the combination of the threading-slide 100, mechanism for forcing said slide to its work, the laterally-projecting pin 103, mounted on said slide, the adjustable ledge 104, the longitudinal shoulder 108, and the spring-pressed pawl 109, for engaging said shoulder, substantially as described, and for the purpose specified.

11. In a machine for threading screws, the combination of the threading-slide 100, the attachable and detachable follower 113, arranged to slide in alignment with said slide, and the cams 24, for pressing upon said follower, substantially as described, and for the purpose specified.

12. The combination of an intermittently-revolving head, a series of spindles mounted therein, the hopper 26, plunger 29, tool-bearing slides 94 and 100, mechanism for driving the spindles when in alignment with said slides, the central shaft D, and the cam-pulley G, substantially as described, and for the purpose specified.

13. The combination of the intermittently-revolving head, a series of spindles mounted therein and provided with friction driving-wheels, the driving-shaft 83, having friction driving-pulley 85, acting upon said wheels at one point for driving them continuously in one direction, the driving-shaft 86, having friction driving-pulley 87 at another point, and shipping mechanism for changing the motion of said driving-shaft 86 to drive the spindles first in one direction and then reversing their motion, substantially as described, and for the purpose specified.

14. The combination of an intermittently-revolving head, a series of hollow spindles mounted therein, the sleeves 37, having spring-jaws 36 and lugs 38, the angle-levers 40, engaging said lugs, the cones 42, and operating mechanism, substantially as described, and for the purpose specified.

15. The combination of an intermittently-revolving head, a series of hollow spindles mounted therein, the sleeves 37, having spring-jaws 36 and lugs 38, the angle-levers 40, engaging said lugs, the cones 42, the sliding carriages 43, carrying said cones, the rollers and projections 45 and 46, stationary cam 47, slides 48, and cams. 49 on the cam-wheel H, substantially as described, and for the purpose specified.

16. The combination of an intermittently-revolving head, a series of hollow spindles mounted therein, the sleeves 37, having spring-jaws 36 and lugs 38, the angle-levers 40, engaging said lugs, the cones 42, the sliding carriages 43, carrying said cones, the rollers and projections 45 and 46, and stationary cams 47 and 115, located in the path of said rollers 45 at the discharging and receiving points of said spring-jaws, substantially as described, and for the purpose specified.

17. The combination of the intermittently-revolving head, a series of spindles mounted therein, the knockout-rods 50, springs 51, cams 52 on the ends of said knockout-rods, and a stop lever or levers located with reference to the path of said cams, substantially as described, and for the purpose specified.

18. The combination of the intermittently-revolving head, a series of spindles mounted therein, the knockout-rods 50, springs 51, for forcing said rods in the direction to free said jaws, and the stationary cam 114, located with reference to the path of the ends of said knockout-rods, substantially as described, and for the purpose specified.

19. The combination of the intermittently-revolving head, a series of spindles mounted therein, mechanism at one point in the revolution of said head for driving the spindles first in one direction and then in another, the threading-slide 100, having a projection or pin 103, and an adjustable ledge for holding said slide against rotation up to a given point, substantially as described, and for the purpose specified.

20. The combination of the shaft 86, set of pulleys 88, shipper 89, cams 93 on the cam-pulley II, and mechanism connecting said cams and shipper, substantially as described, and for the purpose specified.

21. The combination of the intermittently-revolving head, the shaft D, concentric therewith, the slides 96 and 100, cam-pulley G, head-operating disk 61, gear-wheel 19, and mechanism for operatively connecting said gear-wheel and head-operating disk, substantially as described, and for the purpose specified.

22. The combination of the intermittently revolving head, a series of spindles mounted therein, the shaft D, the slides 96 and 100, cam-pulley G, head-operating disk 61, gear-wheel 19, mechanism for operatively connecting said gear-wheel and head-operating disk, the shaft 86, having the set of pulleys 88, shipper 89, cams 93 on cam-pulley II of the shaft D, and connecting mechanism between said shipper and cams, substantially as described, and for the purpose specified.

23. The combination of the intermittently-revolving head, a series of spindles mounted therein and provided with holding-jaws, the sliding carriages mounted on ways secured to said head at the ends of said spindles, mechanism actuated by the longitudinal movement of said carriages for operating said holding-jaws, the projections and rollers 45 and 46, stationary cam 47, and the cams 49 on the wheel H, operatively connected with the projections 46, substantially as described, and for the purpose specified.

GEO. A. FAIRFIELD.
GEO. E. WITHERELL.

Witnesses:
S. H. CURTISS,
DANIEL S. MORRELL.